(12) United States Patent
Singh et al.

(10) Patent No.: US 10,257,074 B1
(45) Date of Patent: Apr. 9, 2019

(54) AVOIDING MULTICAST TRAFFIC LOSS IN NETWORKS HAVING MULTI-HOMING DESIGNATED ROUTERS

(71) Applicant: Juniper Networks, Inc., Sunnyvale, CA (US)

(72) Inventors: Nischal Singh, Bangalore (IN); Rahul Unnikrishnan, Bangalore (IN); Hariharan Boopathy, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 369 days.

(21) Appl. No.: 14/871,006

(22) Filed: Sep. 30, 2015

(51) Int. Cl.
*H04L 12/761* (2013.01)
*H04L 12/707* (2013.01)
*H04L 12/26* (2006.01)
*H04L 29/08* (2006.01)

(52) U.S. Cl.
CPC .......... *H04L 45/16* (2013.01); *H04L 43/0811* (2013.01); *H04L 45/22* (2013.01); *H04L 69/324* (2013.01)

(58) Field of Classification Search
CPC ............... H04L 12/185; H04L 12/1866; H04L 12/1868; H04L 12/4641; H04L 41/147; H04L 45/16; H04L 43/0811; H04L 45/22; H04L 69/324
See application file for complete search history.

(56) References Cited

U.S. PATENT DOCUMENTS

| | | | | |
|---|---|---|---|---|
| 9,344,359 | B1* | 5/2016 | Tiruveedhula | H04L 45/50 |
| 2008/0159311 | A1* | 7/2008 | Martinotti | H04L 45/00 |
| | | | | 370/401 |
| 2008/0205395 | A1* | 8/2008 | Boddapati | H04L 12/1868 |
| | | | | 370/390 |
| 2009/0161670 | A1* | 6/2009 | Shepherd | H04L 45/16 |
| | | | | 370/389 |

(Continued)

OTHER PUBLICATIONS

Adams et al., "Protocol Independent Multicast—Dense Mode (PIM-DM): Protocol Specification (Revised)," RFC 3973, Network Working Group, The Internet Society, Jan. 2005, 61 pp.

(Continued)

*Primary Examiner* — Michael Thier
*Assistant Examiner* — Prince A Mensah
(74) *Attorney, Agent, or Firm* — Shumaker & Sieffert, P.A.

(57) ABSTRACT

Techniques are described for avoiding traffic loss in a network when a designated router (DR) for a L2 broadcast communication domain loses its route toward a multicast traffic source. The disclosed techniques may be utilized in a scenario where a receiver is multi-homed to a DR network device and a non-DR network device by a L2 broadcast communication domain. Both the DR and the non-DR network devices receive a request from the receiver identifying a multicast group in which the receiver is interested. The non-DR network device monitors traffic injected into the L2 broadcast communication domain by the DR in order to determine whether the DR has lost the route to the source (Continued)

of the multicast group. If the DR has lost the route, the non-DR network device performs a repair by sending the multicast data traffic for the multicast group to the receiver on the L2 broadcast communication domain.

25 Claims, 5 Drawing Sheets

(56) References Cited

U.S. PATENT DOCUMENTS

| | | | | |
|---|---|---|---|---|
| 2009/0274042 | A1* | 11/2009 | Asati | H04L 12/185 370/225 |
| 2009/0296709 | A1* | 12/2009 | Duan | H04L 12/18 370/390 |
| 2011/0267962 | A1* | 11/2011 | J S A | H04L 41/147 370/242 |
| 2013/0182581 | A1* | 7/2013 | Yeung | H04L 12/1877 370/244 |
| 2013/0329727 | A1* | 12/2013 | Rajagopalan | H04L 12/4641 370/390 |
| 2014/0029419 | A1* | 1/2014 | Jain | H04L 41/0668 370/228 |
| 2014/0301392 | A1* | 10/2014 | Jain | H04L 12/1886 370/390 |

OTHER PUBLICATIONS

Fenner et al., "Protocol Independent Multicast—Sparse Mode (PIM-SM): Protocol Specification (Revised)," RFC 4601, Network Working Group, The Internet Society, Aug. 2006, 112 pp.

Holbrook et al., "Source-Specific Multicast for IP," RFC 4607, Network Working Group, The Internet Society, Aug. 2006, 19 pp.

Handly et al., "Bidirectional Protocol Independent Multicast (BIDIR-PIM)," RFC 5015, Network Working Group, The Internet Society, Oct. 2007, 43 pp.

Rosen et al., "Multicast in MPLS/BGP IP VPNs," RFC 6513, Internet Engineering Task Force (IETF), IETF Trust, Feb. 2012, 88 pp.

Aggarwal et al., "BGP Encodings and Procedures for Multicast in MPLS/BGP IP VPNs," RFC 6514, Internet Engineering Task Force (IETF), IETF Trust, Feb. 2012, 59 pp.

Xu et al., "PIM-SM DR Priority Auto-Adjustment." IETF Network Working Group Internet Draft, draft-xu-pim-drpriority-auto-adjustment-04, Jun. 4, 2013, 7 pp.

Dib "HSRP Aware PIM" Daniels networking blog, Networking articles by CCIE #37149, Jun. 8, 2015, available at http://lostintransit.se/2015/02/13/hsrp-aware-pim/, last accessed Oct. 25, 2018, 43 pp.

\* cited by examiner

AVOIDING MULTICAST TRAFFIC LOSS IN NETWORKS HAVING MULTI-HOMING DESIGNATED ROUTERS

TECHNICAL FIELD

The disclosure relates to computer networks and, more particularly, to distribution of multicast traffic over computer networks.

BACKGROUND

A computer network is a collection of interconnected computing devices that exchange data and share resources. In a packet-based network the computing devices communicate data by dividing the data into small blocks called packets. Certain devices within the network, such as routers and switches, maintain routing and/or forwarding information that describe paths through the network. In this way, the packets may be individually transmitted across the network from a source device to a destination device. The destination device extracts the data from the packets and assembles the data into its original form. Dividing the data into packets enables the source device to resend only those individual packets that may be lost during transmission.

Examples of computer networks include enterprise networks, branch networks, service provider networks, home networks, virtual private networks (VPNs), local area network (LANs), virtual LANs (VLANs) and the like. In any case, the computer networks may enable remotely located sources and receivers to share data. In some cases, the computer network may be configured to support multicast traffic, such as Internet Protocol Television (IPTV), desktop conferences, corporate broadcasts, music and video web casts, and other forms of multimedia content. For example, the computer network may utilize protocol independent multicast (PIM) as a multicast routing protocol to build distribution trees through the computer network for the transmission of multicast traffic between sources and receivers within customer sites for particular multicast groups. PIM may operate in several different modes, including Dense Mode (DM), Sparse Mode (SM) in Source-Specific Multicast (SSM) mode or Any Source Multicast (ASM) mode, and Bidirectional (BIDIR) mode. In addition, the computer network may be configured to support multicast VPNs (MVPNs) to enable IP multicast traffic to travel between sources and receivers within customer sites.

SUMMARY

In general, this disclosure describes techniques for avoiding traffic blackholing (i.e, traffic loss) in a network when a designated router (DR) loses its route toward a multicast traffic source. The disclosed techniques may be utilized in a scenario where a receiver is multi-homed to a first network device and a second network device by a layer two (L2) broadcast communication domain, and the first network device is a non-DR and the second network device is the DR for the L2 broadcast communication domain. In such an arrangement, both the DR and the non-DR network devices typically receive a request from the receiver identifying a multicast group in which the receiver is interested. Conventionally, only the DR network device sends multicast control messages on behalf of the receiver along a route to the source of the identified multicast group in order to pull down multicast data traffic for the multicast group.

According to the disclosed techniques, the non-DR network device is configured to monitor traffic injected into the L2 broadcast communication domain by the DR network device in order to determine whether the DR network device has lost the route to the source of the multicast group. If the DR has lost the route, the non-DR network device performs a repair by sending the multicast data traffic for the multicast group to the receiver on the L2 broadcast communication domain without performing a DR switchover.

In one example, this disclosure is directed to a method comprising receiving, by a first network device, a request to join a multicast group from a receiver that is multi-homed to the first network device and a second network device by a L2 broadcast communication domain, wherein the second network device is a DR for the L2 broadcast communication domain and the first network device is a non-DR for the L2 broadcast communication domain; monitoring, by the first network device, traffic injected into the L2 broadcast communication domain by the second network device; determining, by the first network device and based on the monitored traffic, that the second network device has lost a route to a source of the multicast group; and based on the determination that the second network device has lost the route to the source of the multicast group, sending, by the first network device, multicast data traffic for the multicast group to the receiver on the L2 broadcast communication domain.

In another example, this disclosure is directed to a network device comprising a receiver-facing port coupled to a L2 broadcast communication domain by which a receiver is multi-homed to the network device and a DR for the L2 broadcast communication domain, wherein the network device is a non-DR for the L2 broadcast communication domain, and a control unit comprising one or more processors. The control unit is further configured to receive a request to join a multicast group from the receiver; monitor traffic injected into the L2 broadcast communication domain by the DR; determine, based on the monitored traffic, that the DR has lost a route to a source of the multicast group; and, based on the determination that the DR has lost the route to the source of the multicast group, send multicast data traffic for the multicast group to the receiver on the L2 broadcast communication domain.

In a further example, this disclosure is directed to a non-transitory computer readable medium storing instructions that when executed cause one or more processors to receive, by a first network device, a request to join a multicast group from a receiver that is multi-homed to the first network device and a second network device by a L2 broadcast communication domain, wherein the second network device is a DR for the L2 broadcast communication domain and the first network device is a non-DR for the L2 broadcast communication domain; monitor, by the first network device, traffic injected into the L2 broadcast communication domain by the second network device; determine, by the first network device and based on the monitored traffic, that the second network device has lost a route to a source of the multicast group; and based on the determination that the second network device has lost the route to the source of the multicast group, send, by the first network device, multicast data traffic for the multicast group to the receiver on the L2 broadcast communication domain.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
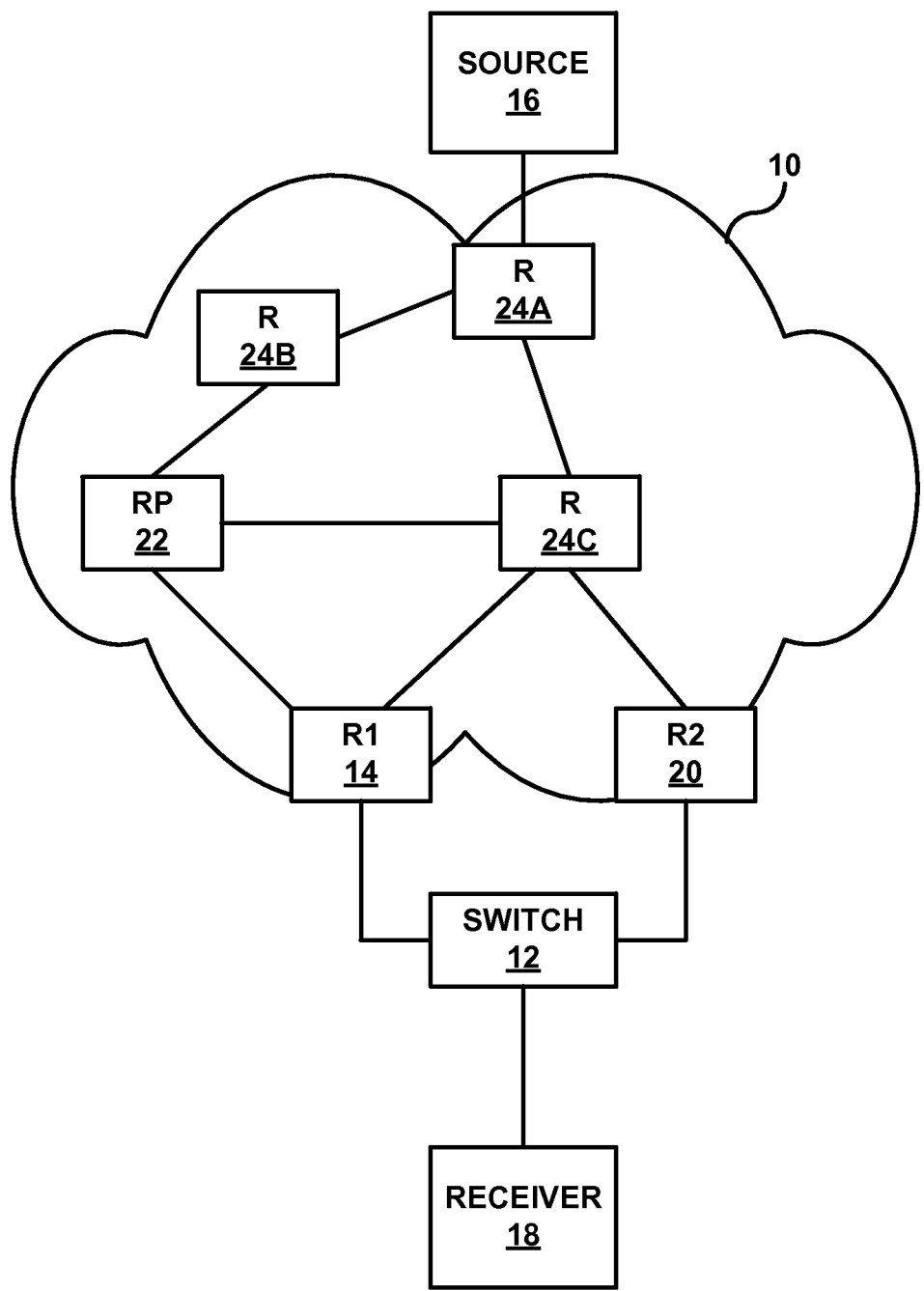
FIG. 1 is a block diagram illustrating an example computer network including network devices configured to transmit multicast traffic between a source and a receiver.

FIG. 1 is a block diagram illustrating an example computer network 10 including network devices configured to transmit multicast traffic between a source 16 and a receiver 18. Network 10 may comprise a private network or a public network, such as the Internet. For example, network 10 may be an enterprise network, a campus network, a service provider network, a home network, a local area network (LAN), a virtual local area network (VLAN), virtual private network (VPN), or another autonomous system. In any of these examples, remotely located source 16 and receiver 18 may share data via network 10. In an example of network 10 as an enterprise network, each of source 16 and receiver 18 may comprise one or more servers or employee computer terminals located in different regions of a single office location, or may comprise a remote office location of a corporation.

In the illustrated example, network 10 comprises an Internet Protocol (IP) network including network devices that use a multicast routing protocol, such as a Protocol Independent Multicast (PIM) protocol, to route multicast traffic through network 10 between source 16 and receiver 18 for particular multicast groups. The PIM protocol may operate in several different modes, including Dense Mode (DM), Sparse Mode (SM) in Source-Specific Multicast (SSM) mode or Any Source Multicast (ASM) mode, and Bidirectional (BIDIR) mode. Additional information regarding PIM protocols may be found in Adams, A., et al., "Protocol Independent Multicast Version 2—Dense Mode Specification," RFC 3973, 2005; Fenner, B., et al., "Protocol Independent Multicast-Sparse Mode (PIM-SM): Protocol Specification (Revised)," RFC 4601, 2006; Holbrook, H. and B. Cain, "Source-Specific Multicast for IP," IETF RFC 4607, 2006; and Handley, M., et al., "Bidirectional Protocol Independent Multicast (BIDIRPIM)," IETF RFC 5015, 2007, the entire contents of each of which are incorporated by reference herein.

Network 10 includes a plurality of network devices, including a first network device R1 14 and a second network device R2 20 that are both connected to receiver 18 via switch 12. In some cases, R1 14 and R2 20 may be referred to as lost hop routers (LHRs) or provider edge (PE) routers connected to receiver 18. Receiver 18 may be considered to be multi-homed to R1 14 and R2 20 by a layer two (L2) broadcast communication domain represented by switch 12. In some examples, the L2 broadcast communication domain by which receiver 18, R1 14, and R2 20 are connected may be a local area network (LAN) (e.g., an Ethernet LAN), and each of R1 14 and R2 20 may be physically coupled to the L2 communication domain by a respective LAN interface. That is, switch 12 may provide upstream-facing ports to which downstream-facing, switch-facing or receiver-facing ports of routers R1 and R2 are coupled. Network 10 also includes routers (R) 24A-24D ("routers 24") and a router designated as a rendezvous point (RP) 22. In some cases, router 24A may be referred to a first hop router (FHR) or PE router connected to source 16. In a typical network topology that utilizes the PIM protocol, additional network devices may be included to the left of RP 22 such that RP 22 is generally centrally located within network 10. For purposes of illustration, these additional network devices are not shown in FIG. 1.

Each of source 16 and receiver 18 may be included in a remote customer site (not shown) that may be a local area network (LAN) or a wide area network (WAN) comprising a plurality of subscriber devices, such as desktop computers, laptops, workstations, PDAs, wireless devices, network-ready appliances, file servers, print servers or other devices. The remote sites may be configured to support multicast traffic, such as Internet Protocol Television (IPTV), desktop conferences, corporate broadcasts, music and video web casts, and other forms of multimedia content.

In some examples, network 10 may include one or more multicast virtual private networks (MVPNs) to enable multicast traffic to travel between sources and receivers, e.g., source 16 and receiver 18, within remote customer sites. The MVPNs may be established between PE routers of network 10, e.g., a first hop router R 24A connected to source 16 and last hop routers R1 14 and R2 20 connected to receiver 18. In general, network 10 may include MVPN inclusive trees or tunnels as single multicast distribution trees configured to carry all multicast traffic from a set of one or more MVPNs. Network 10 may alternatively or additionally include MVPN selective trees or tunnels as single multicast distribution trees configured to carry multicast traffic for a set of one or more multicast groups from one or more MVPNs. In one example, the MVPN inclusive or selective trees may be established through network 10 using the PIM protocol.

MVPN auto-discovery may be provided by a unicast routing protocol, such as border gateway protocol (BGP), used to discover and maintain MVPN memberships of PE routers within network 10. For example, PE routers advertise their MVPN membership to other PE routers using BGP. An MVPN type 1 route is an intra-autonomous system (AS) inclusive provider multicast service interface (I-PMSI) auto discovery (AD) route that is originated by all PE routers participating in an MVPN. The MVPN type 1 route includes a route type indicator, an originating router route distinguisher (RD), and an originating router loopback address. Additional information regarding MVPN may be found in Rosen, E., et al., "Multicast in MPLS/BGP IP VPNs," RFC 6513, February 2012, and Rosen, E., et al., "BGP Encodings and Procedures for Multicast in MPLS/BGP IP VPNs," RFC 6514, February 2012, the entire contents of each of which are incorporated by reference herein.

In the example illustrated in FIG. 1, source 16 may provide traffic for one or more multicast groups, and receiver 18 may request or subscribe to traffic from one or more multicast groups. In other examples, network devices within network 10 may be connected to more than one source and/or more than one receiver. According to the PIM protocol, RP 22 learns and stores source addresses for a certain range of multicast groups provided by source 16 and/or other sources in network 10. Other RPs in network 10, not shown in FIG. 1, may be associated with different ranges of multicast groups provided by source 16 and/or the other sources. In this way, each of the network devices within network 10 does not need to learn and store the source addresses for every multicast group offered in network 10, but only needs to learn the addresses of RP 22 and the other RPs associated with different ranges of multicast groups.

Receiver 18 may comprise an Internet Group Management Protocol (IGMP) host interested in receiving multicast traffic of a certain multicast group. In general, IGMP is a communications protocol used by hosts and adjacent routers to establish multicast group members. In the example of FIG. 1, IGMP operates between receiver 18 in a remote customer site and LHRs R1 14 and R2 20 in network 10. Switch 12, therefore, may comprise an IGMP switch, and R1 14 and R20 may each be configured to use IGMP to communicate with receiver 18 via switch 12.

Receiver 18 may send an IGMP report message to both R1 14 and R2 20 via switch 12 where the IGMP report message identifies the multicast group in which receiver 18 is interested and, in some cases, a source of the multicast group. As described in more detail below, one of R1 14 and R2 20 will be elected a designated router (DR) to act on behalf of receiver 18. Upon receipt of the IGMP report, the DR generates a multicast control message, e.g., a PIM join message, for the multicast group identified in the IGMP report message and sends the multicast control message on a route toward the source of the multicast group, e.g., source 16. If the source of the identified multicast group is unknown, the route toward the source of the multicast group may comprise a route toward RP 22 for the identified multicast group.

In some examples, switch 12 may be capable of performing IGMP snooping to derive useful information by observing IGMP transactions between receiver 18, R1 14, and R2 20. In general, IGMP snooping is the process of listening to IGMP network traffic. This feature allows switch 12 to listen in on the IGMP conversation between receiver 18, R1 14, and R2 20, maintain a map of which links need which multicast traffic, and control which physical ports of switch 12 are used to output (i.e., forward) the multicast traffic received from routers R1 14, R2 20 instead of flooding all multicast traffic to all ports of the L2 broadcast communication domain. For the techniques described in this disclosure, however, IGMP snooping is turned off on switch 12. In this case, the one of R1 14 and R2 20 acting as a non-DR will receive all the multicast traffic that is injected into the L2 broadcast communication domain by the DR and flowing upstream on the receiver-facing port of the non-DR that is coupled to the L2 broadcast communication domain.

In one example, a PIM instance associated with the receiver-facing port of R1 14 is a designated router (DR) for the L2 broadcast communication domain, and a PIM instance associated with the receiver-facing port of R2 20 is a non-DR for the L2 broadcast communication domain. In accordance with the PIM protocol, the DR is a network device elected to forward PIM control messages from a receiver upstream towards a source of a multicast group or, if the source is unknown, a RP for the multicast group. The PIM DR may be elected based on PIM Hello message exchanged between neighboring PIM routers. The PIM DR should not be confused with a PIM designated forwarder (DF), which is a network device elected to forward multicast traffic from the source or the RP downstream towards the receiver. The PIM DF may be elected based on a PIM Assert mechanism. DR elections and Hello messages in PIM-SM are described in more detail with respect to RFC 4601, referenced above.

In the example where R1 14 is the DR for the L2 broadcast communication domain (e.g., LAN) by which receiver 18 is multi-homed to R1 14 and R2 20, receiver 18 may send an IGMP report message requesting to join a multicast group, and the IGMP report message may be broadcast on the L2 broadcast communication domain to both R1 14 and R2 20 via switch 12. In this example, only R1 14 as the DR generates and forwards a multicast join message towards source 16 or RP 22. In the case that the route towards the source is unavailable, e.g., due to reasons such as a core interface of R1 14 being down or interface down events in upstream routers of R1 14, then R1 14 will lose its route towards the source and will not be able to send the multicast join message towards source 16 or RP 22. Since R1 14 still remains the DR for the L2 broadcast communication domain, R2 20 as the non-DR for the L2 broadcast communication domain will not forward multicast join messages towards the source. In this case, receiver 18 will not receive the multicast traffic for the identified multicast group until R1 14 regains its route towards the source, even though an alternate path is available via R2 20. This issue may also arise in a MVPN scenario where R1 14 and R2 20 are the PE routers to which receiver 18 is multi-homed.

In one approach described in Xu, X., "PIM-SM DR Priority Auto-Adjustment," IETF Network Working Group, Internet Draft, draft-xu-pim-drpriority-auto-adjustment-04, June 2013, available from http://tools.ietf.org/html/draft-xu-pim-drpriority-auto-adjustment-04, the above described issue may be mitigated by tracking upstream interfaces in a DR and lowering a DR priority based on interface down events. This approach is similar to Virtual Router Redundancy Protocol (VRRP) interface tracking. One example drawback of this approach is that it may not necessarily handle failures occurring on the upstream routers of the DR or protocol-level failures.

In general, this disclosure describes techniques for avoiding traffic blackholing (i.e., traffic loss) in a network when a DR, e.g., R1 14, loses its route toward a multicast traffic source. The disclosed techniques may be utilized in the scenario where receiver 18 is multi-homed to R1 14 and R2 29 by the L2 broadcast communication domain represented by switch 12, and R2 20 is the non-DR for the L2 broadcast communication domain and the R1 14 is the DR for the L2 broadcast communication domain. Both R1 14 and R2 20 receive a request from receiver 18 identifying a multicast group in which receiver 18 is interested. Conventionally, only R1 14 as the DR sends multicast control messages on behalf of receiver 18 along a route toward source 16 or RP 22 of the identified multicast group in order to pull down multicast data traffic for the multicast group. According to the disclosed techniques, R2 20 as the non-DR monitors traffic that is injected into the L2 broadcast communication domain by DR R1 14 and received on a receiver-facing port of non-DR R2 20 that is coupled of the L2 broadcast communication domain in order to determine whether R1 14 has lost the route toward the source of the multicast group. If R1 14 has lost the route, R2 20 as the non-DR performs a repair by sending the multicast data traffic for the multicast group to receiver 18 on the L2 broadcast communication domain. R2 20 as the non-DR may perform this repair without performing a DR switchover such that D1 14 remains the DR for the L2 broadcast communication domain.

Figure 2A:
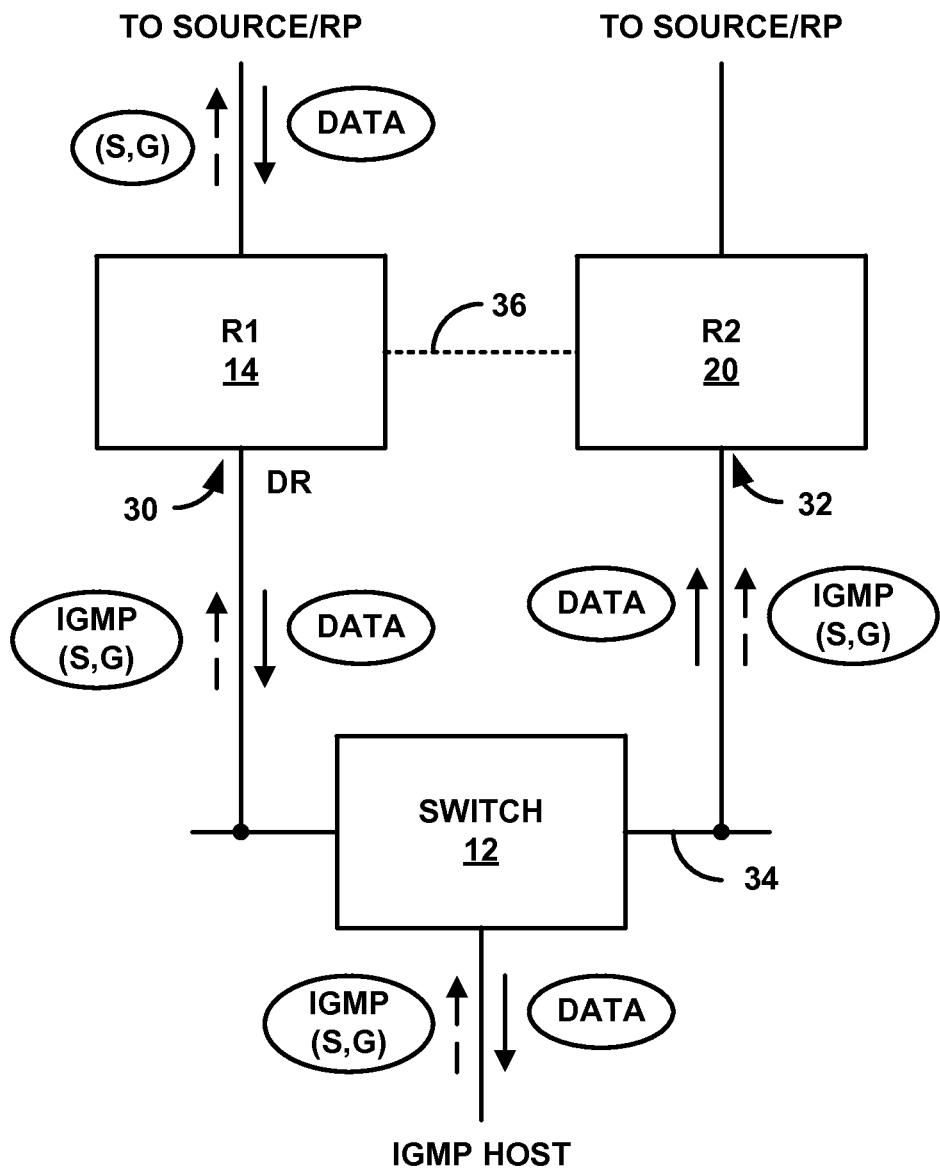
FIGS. 2A-2B are block diagrams illustrating several network devices from FIG. 1 configured to avoid traffic blackholing when a multi-homing designated router loses its route towards a source, in accordance with techniques of this disclosure.
Figure 2B:
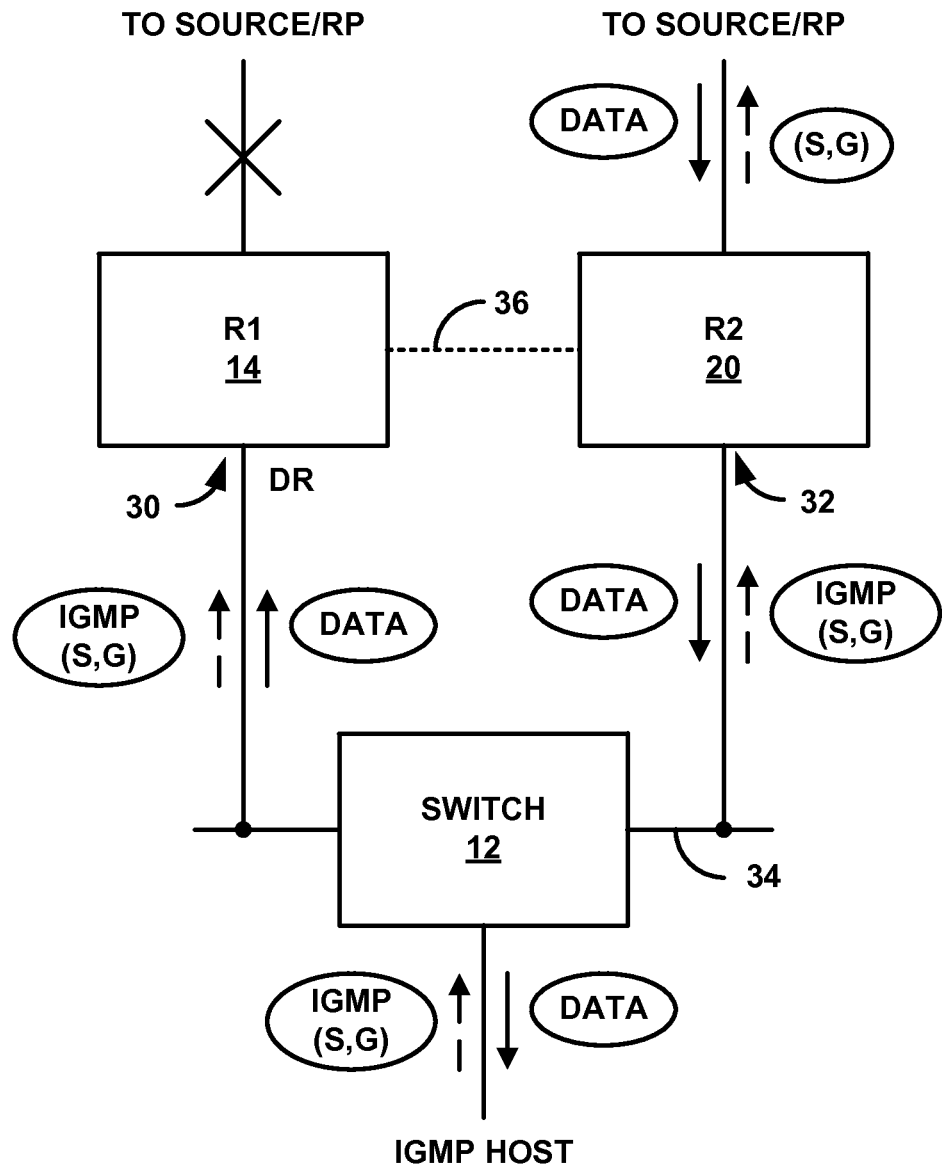

FIGS. 2A-2B are block diagrams illustrating several network devices from FIG. 1 configured to avoid traffic blackholing when a multi-homing designated router loses its route towards a source, in accordance with techniques of this disclosure. In FIGS. 2A and 2B, the dashed arrows indicate multicast control messages, and the solid arrows indicate multicast data traffic. In the example of FIGS. 2A and 2B, R1 14 and R2 20 are configured to use PIM as the multicast routing protocol. In other examples, R1 14 and R2 20 may use a different multicast routing protocol. In addition, in the example of FIGS. 2A and 2B, a source (S) of a requested multicast group (G) is known and join requests may be represented as (S,G) join messages. In other examples, the source may be unknown and join requests may be represented as (*,G) join messages.

As illustrated in FIG. 2A, when an IGMP report message (e.g., IGMP (S,G)) is sent from the IGMP host, switch 12 broadcasts the IGMP report message on a L2 broadcast communication domain 34 (e.g., an Ethernet LAN) and both R1 14 and R2 20 receive copies of the IGMP report message on their respective receiver-facing ports 30, 32 that are coupled to L2 broadcast communication domain 34. In the case where R1 14 is elected the DR for L2 broadcast communication domain 34, R1 14 converts the IGMP report message to a PIM join message and forwards the PIM join message (e.g., (S,G)) toward the source or the RP of the identified multicast group. In some examples, receiver-facing port 32 of R2 20 may be marked as pruned as a downstream interface for multicast traffic of the requested multicast group. In this way, R2 20, as the non-DR for L2 broadcast communication domain 34, will not send any received multicast data traffic toward the IGMP host on L2 broadcast communication domain 34. Based on the received IGMP report message, R2 20 knows the multicast group in which the IGMP host is interested. When the multicast data traffic is flowing from the source to R1 14, R1 14, as the DR for L2 broadcast communication domain 34, will send the multicast data traffic on its receiver-facing port 30 toward the IGMP host on L2 broadcast communication domain 34. Switch 12, on which IGMP snooping is disabled, then floods the multicast data traffic on L2 broadcast communication domain 34 such that R2 20 will receive the multicast data traffic on its receiver-facing port 32 that is coupled to L2 broadcast communication domain 34.

In the examples described in this disclosure, switch 12 is configured to operate with IGMP snooping disabled, which enables switch 12 to flood all received IGMP report messages and multicast traffic on L2 broadcast communication domain 34. In addition, receiver-facing port 32 of R2 20 may be pruned as a downstream interface for the identified multicast group such that when R2 20 receives multicast traffic for the multicast group on receiver-facing port 32 coupled to L2 broadcast communication domain 34, R2 20 does not send the received multicast data traffic back toward the IGMP host on L2 broadcast communication domain 34.

In one example of the techniques of this disclosure, R2 20, as the non-DR, is configured to monitor the multicast data traffic for the requested multicast group that is injected into L2 broadcast communication domain 34 by R1 14, as the DR, and received on receiver-facing port 32 of R2 20 that is coupled to L2 broadcast communication domain 34. When a failure occurs that causes R1 14, as the DR, to lose its route toward the source of the multicast group, R2 20 may receive less than a threshold level of the multicast data traffic for the multicast group. In some examples, R2 20 may stop receiving any multicast data traffic for the multicast group. As illustrated in FIG. 2B, R2 20 may then begin forwarding PIM join messages (e.g., (S,G)) upstream toward the source or RP of the multicast group, and pulling the requested multicast data traffic from the source. R2 20 as the non-DR for L2 broadcast communication domain 34 may then send the multicast data traffic on its receiver-facing port 32 toward the IGMP host via switch 12 on L2 broadcast communication domain 34.

When R2 20, as the non-DR for L2 broadcast communication domain 34, again receives more than the threshold level of the multicast data traffic for the multicast group on its receiver-facing port 32 (as illustrated in FIG. 2A), R2 20 may stop the repair by sending a PIM prune message towards the source or RP to stop receiving the multicast data traffic for the multicast group from the source of the multicast group. For a brief moment, both R1 14 and R2 20 may be forwarding the multicast data traffic for the multicast group toward the IGMP host on L2 broadcast communication domain 34 such that there is a possibility that a PIM Assert mechanism may be triggered to elect a PIM designated forwarder (DF) for L2 broadcast communication domain 34. According to the disclosed techniques, R2 20 as the non-DR for L2 broadcast communication domain 34 will not participate in the PIM Assert mechanism. Instead, R2 20 will send the PIM prune message towards the source or RP upon detecting that R1 14, as the DR for L2 broadcast communication domain 34, has recovered its route towards the source.

If the above described approach is implemented in an MVPN scenario with an MVPN inclusive tunnel, the repair may be performed faster as R2 20 will already be receiving the multicast data traffic for the multicast group via the MVPN inclusive tunnel. In this case, R2 20 may then simply add its receiver-facing port 32 that is coupled to L2 broadcast communication domain 34 as a downstream interface for the multicast group, and begin forwarding the multicast data traffic on the downstream interface toward the IGMP host on L2 broadcast communication domain 34. If the above described approach is implemented in an MVPN scenario with an MVPN selective tunnel, R2 20 may send a MVPN join towards the source or RP after R2 20 detects that less than the threshold level of the multicast data traffic for the multicast group is hitting its receiver-facing port 32 (as illustrated in FIG. 2B).

In another example of the techniques of this disclosure, R2 20, as the non-DR for L2 broadcast communication domain 34, is configured to perform a repair to avoid traffic blackholing when R1 14, as the DR, loses its route towards a source of a multicast group in a BGP MVPN scenario by monitoring MVPN control messages received over a BGP session 36 between R1 14 and R2 20. As described above, a IGMP report message (e.g., IGMP (S,G)) from the IGMP host is broadcast on the L2 broadcast communication domain 34 by switch 12, and received by both R1 14 and R2 20 on their respective receiver-facing ports 30, 32 that are coupled to L2 broadcast communication domain 34. Based on the received IGMP report message, R2 20 knows the multicast group in which the IGMP host is interested. In addition, receiver-facing port 32 of R2 20 may be marked as pruned for the identified multicast group because R2 20 is the non-DR for L2 broadcast communication domain 34.

When the receiver-facing port 32 of R2 20 is added to PIM, a router-id of R1 14 that is elected as the DR for L2 broadcast communication domain 34 may be specified. According to the techniques of this disclosure, R2 20, as the non-DR, may be configured to constantly monitor the MVPN subsequent address family identifier (SAFI) routes received from R1 14 via BGP session 36. When an MVPN type 1 route belonging to R1 14 is not available in R2 20, R2 20 may detect a failure in R1 14. In this case, R1 14 will not be able to forward the multicast data traffic for the multicast group on its receiver-facing port 30 toward the IGMP host on L2 broadcast communication domain 34. As illustrated in FIG. 2B, R2 20, as the non-DR, may then start forwarding MVPN join messages upstream towards the source or the RP, and pulling the requested multicast data traffic from the source. R2 20, as the non-DR, may then send the multicast data traffic on its receiver-facing port 32 toward the IGMP host via switch 12 on L2 broadcast communication domain 34.

In case of an MVPN inclusive tunnel, the repair may be faster as R2 20 will already be receiving the multicast data traffic for the multicast group via the MVPN inclusive tunnel. In this case, R2 20 may then simply add its receiver-facing port 32 that is coupled to L2 broadcast communication domain 34 as a downstream interface for the multicast group, and begin forwarding the multicast data traffic on the downstream interface toward the IGMP host on L2 broadcast communication domain 34. When R2 20 again detects via BGP session 36 that the MVPN type 1 route from R1 14 is available, R2 20 may stop the repair by removing receiver-facing port 32 that is coupled to the L2 broadcast communication domain as the downstream interface for the multicast group to stop sending the multicast data traffic for the multicast group toward the IGMP host on the L2 broadcast communication domain In the case of an MVPN selective tunnel, R2 20 may send a MVPN join towards the source or RP after R2 20 detects via BGP session 36 that the MVPN type 1 route from R1 14 is not available (as illustrated in FIG. 2B). When R2 20 again detects via BGP session 36 that the MVPN type 1 route from R1 14 is available, R2 20 may stop the repair by sending a MVPN prune message towards the source or RP to stop receiving the multicast data traffic for the multicast group from the source of the multicast group.

Figure 3:
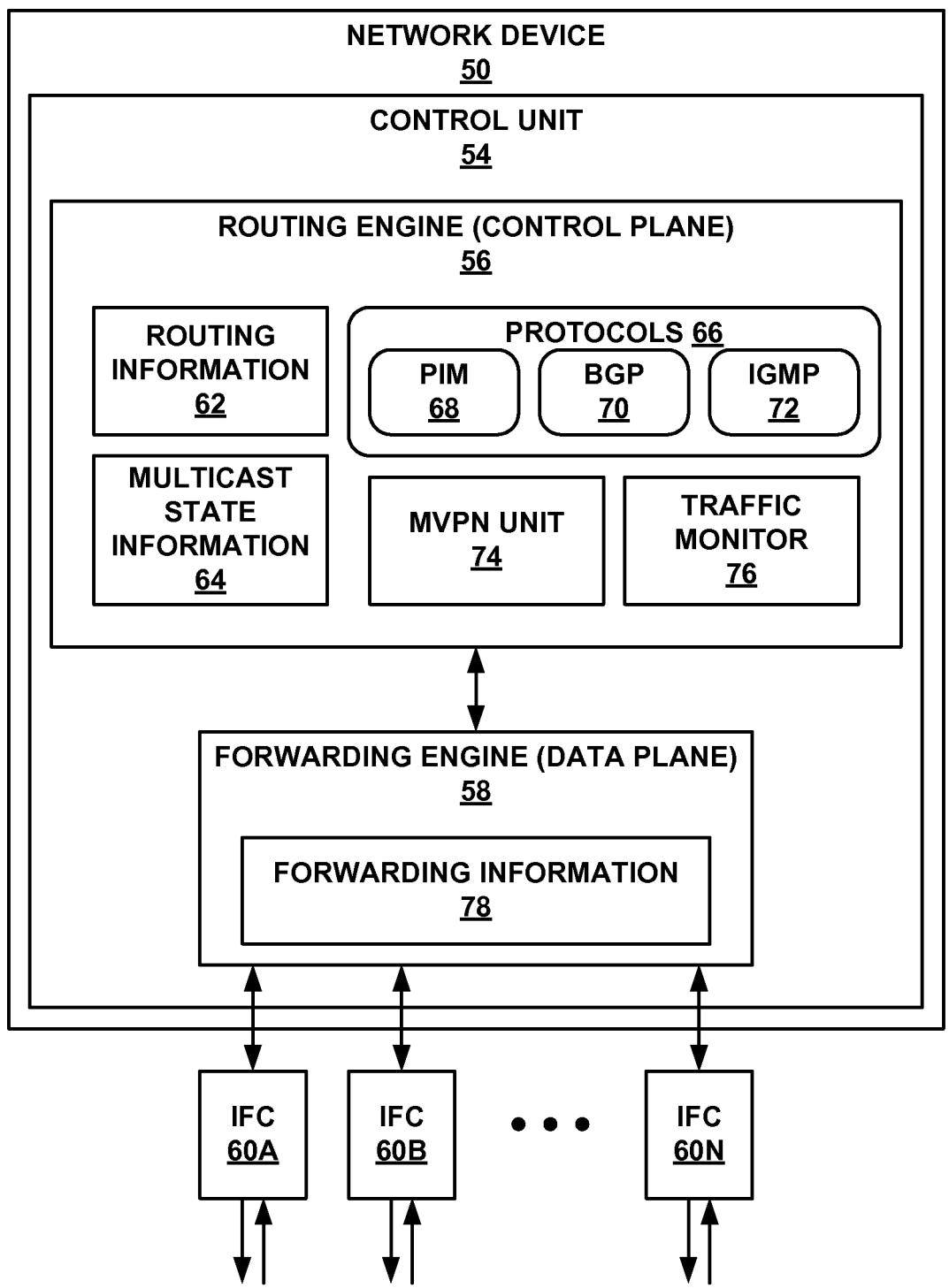
FIG. 3 is a block diagram illustrating an example network device configured to operate in accordance with techniques of this disclosure.

FIG. 3 is a block diagram illustrating an example network device 50 configured to operate in accordance with techniques of this disclosure. In one example, network device 50 may operate as a non-DR for a L2 broadcast communication domain (e.g., an Ethernet LAN) by which a receiver is multi-homed to network device 50 as the non-DR and to another network device elected to operate as the DR for the L2 broadcast communication domain. According to the disclosed techniques, as the non-DR for the L2 broadcast communication domain, network device 50 is configured to perform a repair to avoid traffic blackholing (i.e., traffic loss) when the DR loses its route towards a source. For example, network device 50 may operate substantially similar to R2 20 from FIGS. 1 and 2A-2B.

In the illustrated example of FIG. 3, network device 50 includes interface cards 60A-60N ("IFCs 60") that receive control and data packets via incoming links and send control and data packets via outbound links. IFCs 60 are typically coupled to the incoming links and the outbound links via a number of interface ports. Network device 50 also includes a control unit 54 that determines routes of received packets and forwards the packets accordingly via IFCs 60. One of IFCs 60 of network device 50 may include a receiver-facing port (e.g., receiver-facing port 32 from FIGS. 2A-2B) that is coupled to the L2 broadcast communication domain (e.g., L2 broadcast communication domain 34 from FIGS. 2A-2B) for which network device 50 operates as the non-DR.

Control unit 54 includes a routing engine 56 and a forwarding engine 58. Routing engine 56 operates as the control plane for router 50 and includes an operating system (not shown) that may provide a multi-tasking operating environment for execution of a number of concurrent processes. For example, routing engine 56 provides an operating environment for various protocols 66 that perform routing functions for network device 50. In the illustrated example of FIG. 3, routing engine 56 includes a border gateway protocol (BGP) 70 as a unicast routing protocol used to exchange routing information with other network devices in a network in order to discover the network topology and update routing information 62. In addition, routing engine 56 includes PIM 68 as a multicast routing protocol used to build multicast distribution trees with the other network devices in the network using routing information 62 and multicast state information 64.

Routing engine 56 also includes IGMP 72 as a communications protocol used to establish multicast group memberships with IGMP hosts, e.g., receivers and sources, within customer sites external to the network. In some examples, routing engine 56 may receive IGMP report messages identifying a multicast group and, in some cases, a source of the multicast group in which an IGMP host is interested. Routing engine 56 may then use PIM 68 to generate the multicast control messages (e.g., PIM join messages and/or PIM prune messages) used to build the multicast distribution trees in the network.

Routing information 62 may describe the topology of the network in which network device 50 resides, and may also describe various routes within the network and the appropriate next hops for each route, i.e., the neighboring network devices along each of the routes. Routing information 62 may include a list of incoming interfaces (IIFs) and a list of outgoing interfaces (OIFs) that indicate which of IFCs 60 are connected to the neighboring network devices in each route. For example, a given route may comprise a multicast route for multicast traffic of a given multicast group. In that example, the list of IIFs included in routing information 62 may include a list of upstream interfaces for all upstream neighbor network devices that have state for the given multicast group, and the list of OIFs included in routing information 62 may include a list of downstream interfaces for all downstream neighbor network devices that have state for the given multicast group.

Multicast state information 64 may describe a current status of interfaces for the neighboring network devices in the multicast distribution trees established using PIM 68. For example, multicast state information 64 may include multicast state (e.g., PIM join state and PIM prune state) for each different multicast group within a range for a given multicast distribution tree. More specifically, for each multicast group, multicast state information 64 may include upstream and downstream interfaces toward neighboring network devices that belong to the respective multicast group.

MVPN unit 74 may be configured to establish and maintain MVPN distribution trees or tunnels within the network using one or both of PIM 68 and BGP 70. In addition, MVPN unit 74 may map MVPN membership information of other network devices within the network and generate multicast state for a given MVPN based on the MVPN membership information. In some examples, MVPN unit 74 may store multicast state for one or more MVPNs in multicast state information 64.

Routing engine 56 analyzes routing information 62 and multicast state information 64 to generate forwarding information 78 installed in forwarding engine 58. Forwarding engine 58 provides data plane functionality for network device 50. Although not shown in FIG. 3, forwarding engine 58 may comprise a central processing unit (CPU), memory and one or more programmable packet-forwarding application-specific integrated circuits (ASICs). Forwarding information 78 associates network destinations with specific next hops and corresponding ports of IFCs 60.

According to the techniques of this disclosure, network device 50 as a non-DR for an L2 broadcast communication domain is configured to perform a repair upon determining that the DR for the L2 broadcast communication domain has lost its route to a source of a multicast group in which a receiver, multi-homed to the DR and network device 50 as the non-DR, is interested. Network device 50 may perform this repair as the non-DR for the L2 broadcast communication domain without performing a DR switchover. In other words, network device 50 does not need to be elected the DR for the L2 broadcast communication domain in order to perform the repair as described in this disclosure.

In general, network device 50 receives a join request from the receiver on a receiver-facing port included in one of IFCs 60 that is coupled to the L2 broadcast communication domain in the form of an IGMP report message. In this way, network device 50 knows the multicast group in which the receiver is interested. Because network device 50 is the non-DR for the L2 broadcast communication domain, routing engine 56 will not use PIM 68 to generate multicast control messages based on the IGMP report message. Instead, according to the disclosed techniques, traffic monitor 76 within routing engine 56 of network device 50 is configured to begin monitoring traffic injected into the L2 broadcast communication domain by the DR. In some examples, traffic monitor 76 may be configured to monitor multicast data traffic for the identified multicast group that is injected into the L2 broadcast communication domain by the DR and received on a receiver-facing port included in one of IFCs 60, e.g., receiver-facing port 32 from FIGS. 2A-2B. In other examples, traffic monitor 76 may be configured to monitor MVPN control traffic that is injected into the L2 broadcast communication domain by the DR and received by network device 50 via a BGP session, e.g., BGP session 36 from FIGS. 2A-2B. The MVPN control traffic may comprise a MVPN type 1 route for the DR, which is an intra-AS I-PMSI AD route.

Routing engine 56 analyzes the monitored traffic from traffic monitor 76 and, at some point, determines that the DR has lost the route to the source of the multicast group. In response to determining that the DR has lost the route to the source of the multicast group, network device 50, operating as the non-DR for the L2 broadcast communication domain, begins sending the multicast data traffic for the multicast group toward the receiver on the L2 broadcast communication domain. For example, routing engine 56 may use PIM 68 to build or join a multicast distribution tree to receive the multicast data traffic for the multicast group from the source of the multicast group. Routing engine 56 may also update routing information 62 and forwarding information 78 to add one of IFCs 60 that includes the receiver-facing port of network device 50 as a downstream interface for the multicast group.

In this way, network device 50, as the non-DR for the L2 broadcast communication domain, may send the multicast data traffic toward the receiver on the L2 broadcast communication domain and avoid traffic loss when the DR for the L2 broadcast communication domain has lost its route to the source of the multicast group. Network device 50 may perform this repair as the non-DR without performing a DR switchover. This repair may be maintained until routing engine 56 of network device 50 analyzes the monitored traffic from traffic monitor 76 and determines that the DR has recovered its route to the source of the multicast group.

The architecture of network device 50 illustrated in FIG. 3 is shown for exemplary purposes only and should not be limited to this architecture. In other examples, network device 50 may be configured in a variety of ways. In one example, some of the functionally of control unit 54 may be distributed within IFCs 60. Control unit 54 may be implemented solely in software, or hardware, or may be implemented as a combination of software, hardware, or firmware. For example, control unit 54 may include one or more processors which execute software instructions. In that case, the various software modules of control unit 54 may comprise executable instructions stored on a computer-readable medium, such as computer memory or hard disk.

Figure 4:
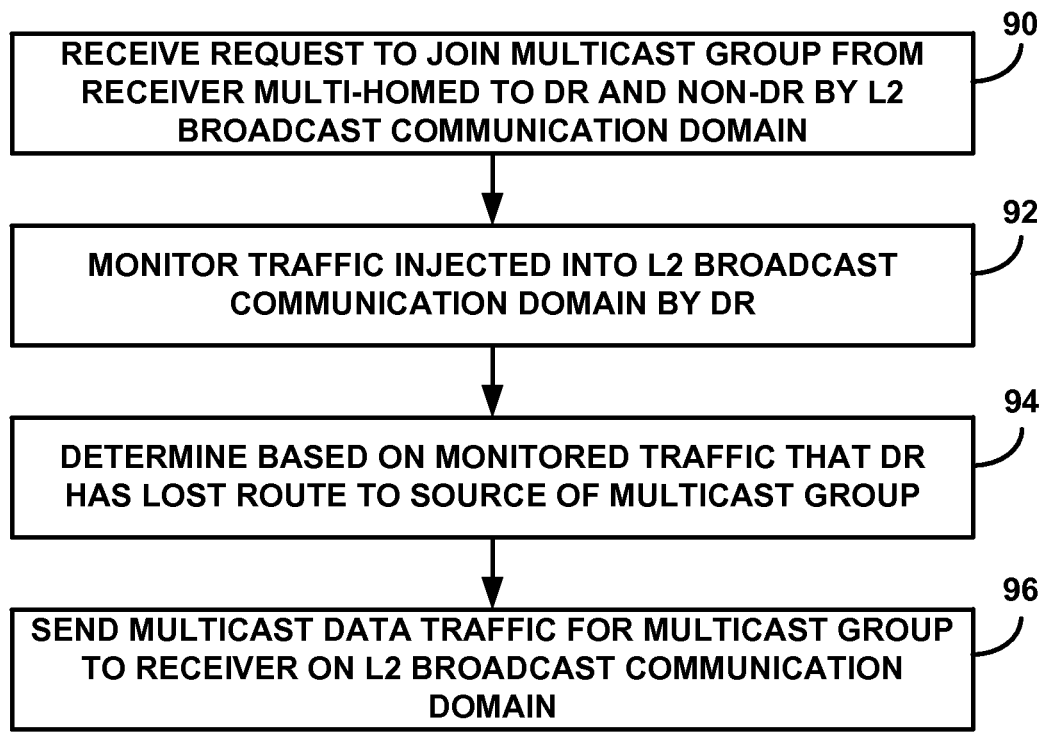
FIG. 4 is a flowchart illustrating an example operation of a network device performing a repair to avoid traffic blackholing when a multi-homing designated router loses its route towards a source.

FIG. 4 is a flowchart illustrating an example operation of a network device performing a repair to avoid traffic loss when a multi-homing designated router loses its route towards a source. The example operation of FIG. 4 is described with respect to network device 50 from FIG. 3 when operating as a non-DR for a L2 broadcast communication domain (e.g., an Ethernet LAN) by which a receiver is multi-homed to network device 50 as the non-DR and to another network device elected to operate as the DR for the L2 broadcast communication domain. In other examples, the operation of FIG. 4 may also be performed by R2 20 from FIGS. 2A-2B.

When a receiver connected to a network, such as receiver 18 from FIG. 1, is an IGMP host device interested in receiving multicast traffic for a multicast group, the receiver will send a request to join the multicast group in the form of an IGMP report message identifying the multicast group and, in some cases, a source of the multicast group. In the case where the receiver is multi-homed to two or more network devices in the network, the receiver may send the IGMP report message to a network switch on a L2 broadcast communication domain, e.g., switch 12 on L2 broadcast communication domain 34 from FIGS. 2A-2B. The network switch broadcasts the IGMP report message on the L2 broadcast communication domain, to which the network devices are coupled via respective receiver-facing ports. As described above, the network devices coupled to the L2 broadcast communication domain participate in a DR election process for the L2 broadcast communication domain to elect one of the network devices as the DR to act on behalf of the multi-homed receiver.

Network device 50 operating as the non-DR for the L2 broadcast communication domain receives the request to join the multicast group from the receiver that is multi-homed to the DR and network device 50 as the non-DR by the L2 broadcast communication domain (90). Upon receiving the join request, network device 50 knows the multicast group in which the receiver is interested. Traffic monitor 76 within routing engine 56 of network device 50 then monitors traffic injected into the L2 broadcast communication domain by the DR (92). At this point, the DR has a route to the source of the identified multicast group, and is receiving the multicast data traffic for the multicast group and forwarding the multicast data traffic to the receiver on the L2 broadcast communication domain.

Routing engine 56 analyzes the monitored traffic and, at some point, determines that the DR has lost the route to the source of the multicast group (94). In response to determining that the DR has lost the route to the source of the multicast group, network device 50 operating as the non-DR for the L2 broadcast communication domain begins sending the multicast data traffic for the multicast group to the receiver on the L2 broadcast communication domain (96). For example, network device 50 may build or join a multicast distribution tree to receive the multicast data traffic for the multicast group from the source of the multicast group, and then forward the multicast data traffic to the receiver on the L2 broadcast communication domain. According to the techniques of this disclosure, network device 50 may perform this repair as the non-DR for L2 broadcast communication domain without performing a DR switchover.

In some examples, traffic monitor 76 of network device 50 may be configured to monitor multicast data traffic for the identified multicast group that is injected into the L2 broadcast communication domain by the DR and received on a receiver-facing port of network device 50 (e.g., a port included in one of IFCs 60) that is coupled to the L2 broadcast communication domain. In this example, the DR has the route to the source of the multicast group, and is receiving the multicast data traffic for the multicast group and forwarding the multicast data traffic to the receiver on the L2 broadcast communication domain. The network switch on the L2 broadcast communication domain sends the multicast data traffic to the receiver, and also floods the multicast data traffic on the L2 broadcast communication domain such that network device 50 as the non-DR receives the multicast data traffic on its receiver-facing port coupled to the L2 broadcast communication domain. For the techniques of this disclosure, the network switch may be configured to not perform IGMP snooping. In this way, network device 50 will receive the multicast data traffic for the multicast group that is injected into the L2 broadcast communication domain by the DR. The receiver-facing port of network device 50 may be pruned as a downstream interface for the multicast group so that network device 50 does not send the multicast data traffic back to the receiver on the L2 broadcast communication domain.

At some point, network device 50 may receive less than a threshold level of the multicast data traffic for the multicast group or may stop receiving any the multicast data traffic for the multicast group on its receiver-facing port. Based on network device 50 receiving less than the threshold level of multicast data traffic or no multicast data traffic on its receiver-facing port, routing engine 56 of network device 50 determines that the DR is not forwarding the multicast data packets for the multicast group to the receiver on the L2 broadcast communication domain and has lost its route to the source of the multicast group. In response to determining that the DR has lost its route to the source of the multicast group, network device 50 operating as the non-DR sends a join message for the multicast group toward the source or the RP of the multicast group, receives the multicast data traffic for the multicast group from the source of the multicast group, and forwards the multicast data traffic for the multicast group to the receiver on the L2 broadcast communication domain.

During the repair, traffic monitor 76 of network device 50 may continue to monitor any traffic injected into the L2 broadcast communication domain by the DR. For example, network device 50 may determine that the DR has recovered the route to the source of the multicast group based on the receipt of more than the threshold level of the multicast data traffic for the multicast group on the receiver-facing port of network device 50. Based on the determination that the DR has recovered the route to the source of the multicast group, network device 50 sends a prune message for the multicast group toward the source of the multicast group to stop receiving the multicast data traffic for the multicast group from the source of the multicast group. During the brief moment when the DR and network device 50 as the non-DR may both be forwarding the multicast data traffic for the multicast group to the receiver, a PIM Assert mechanism may be triggered to elect a DF for the L2 broadcast communication domain. According to the techniques of this disclosure, network device 50, as the non-DR for the L2 broadcast communication domain, will not participate in the PIM Assert mechanism.

In other examples, traffic monitor 76 within routing engine 56 of network device 50 may be configured to monitor MVPN control traffic that is injected into the L2 broadcast communication domain by the DR and received by network device 50 via a BGP session, e.g., BGP session 36 from FIGS. 2A-2B. The MVPN control traffic may comprise a MVPN type 1 route for the DR, which is an intra-AS I-PMSI AD route. In this example, the DR has the route to the source of the multicast group, and is receiving the multicast data traffic for the multicast group and forwarding the multicast data traffic to the receiver on the L2 broadcast communication domain. At some point, based on the monitored BGP session, routing engine 56 may determine that an MVPN type 1 route for the DR is not available in network device 50 and that a failure has occurred in the DR. In this way, routing engine 56 of network device 50 determines that the DR is not forwarding the multicast data packets for the multicast group to the receiver on the L2 broadcast communication domain and has lost the route to the source of the multicast group.

In the case where the DR receives the multicast data packets for the multicast group from the source of the multicast group via a MVPN selective tunnel, in response to determining that the DR has lost the route to the source of the multicast group, network device 50 operating as the non-DR sends a join message for the multicast group toward the source or the RP of the multicast group, receives the multicast data traffic for the multicast group from the source of the multicast group, and forwards the multicast data traffic for the multicast group to the receiver on the L2 broadcast communication domain.

During the repair, traffic monitor 76 of network device 50 may continue to monitor any traffic injected into the L2 broadcast communication domain by the DR and received by network device 50 via the BGP session. For example, network device 50 may determine that the DR has recovered the route to the source of the multicast group based on once again detecting the MVPN type 1 route for the DR via the BGP session. Based on the determination that the DR has recovered the route to the source of the multicast group, network device 50 sends a prune message for the multicast group toward the source of the multicast group to stop receiving the multicast data traffic for the multicast group from the source of the multicast group.

In the case where the DR and network device 50 as the non-DR both receive the multicast data packets for the multicast group from the source of the multicast group via a MVPN inclusive tunnel, in response to determining that the DR has lost the route to the source of the multicast group, routing engine 56 of network device 50 adds its receiver-facing port that is coupled to the L2 broadcast communication domain as a downstream interface for the multicast group, and forwards the multicast data traffic for the multicast group on the downstream interface for the multicast group to the receiver on the L2 broadcast communication domain.

During the repair, traffic monitor 76 of network device 50 may continue to monitor any traffic injected into the L2 broadcast communication domain by the DR and received by network device 50 via the BGP session. For example, network device 50 may determine that the DR has recovered the route to the source of the multicast group based on once again detecting the MVPN type 1 route for the DR via the BGP session. Based on the determination that the DR has recovered the route to the source of the multicast group, routing engine 56 of network device 50 removes its receiver-facing port as the downstream interface for the multicast group to stop sending the multicast data traffic for the multicast group to the receiver on the L2 broadcast communication domain.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various examples have been described in this disclosure. These and other examples are within the scope of the following claims.

What is claimed is:

1. A method comprising:
   receiving, by a first network device, a request to join a multicast group from a receiver that is multi-homed to the first network device and a second network device by a layer two (L2) broadcast communication domain, wherein the second network device is a designated router (DR) for the L2 broadcast communication domain and the first network device is a non-DR for the L2 broadcast communication domain;
   monitoring, by the first network device, traffic associated with the multicast group that is injected into the L2 broadcast communication domain by the second network device and received by the first network device;
   determining, by the first network device and based on the monitored traffic, that the second network device has lost a route to a source of the multicast group; and
   based on the determination that the second network device has lost the route to the source of the multicast group, sending, by the first network device as the non-DR, multicast data traffic for the multicast group to the receiver on the L2 broadcast communication domain without performing a DR switchover, wherein sending the multicast data traffic for the multicast group comprises: sending, by the first network device, a join message for the multicast group toward the source of the multicast group; receiving, by the first network device, the multicast data traffic for the multicast group from the source of the multicast group; and forwarding, by the first network device, the multicast data traffic for the multicast group to the receiver on the L2 broadcast communication domain.

2. The method of claim 1, wherein monitoring the traffic injected into the L2 broadcast communication domain by the second network device comprises monitoring, by the first network device, multicast data traffic for the multicast group that is injected into the L2 broadcast communication domain by the second network device and received on a receiver-facing port of the first network device that is coupled to the L2 broadcast communication domain.

3. The method of claim 2, wherein, based on the first network device receiving less than a threshold level of the multicast data traffic for the multicast group on the receiver-facing port that is coupled to the L2 broadcast communication domain, determining that the second network device has lost the route to the source of the multicast group comprises determining, by the first network device, that the second network device is not forwarding the multicast data traffic for the multicast group to the receiver on the L2 broadcast communication domain.

4. The method of claim 1, further comprising:
   determining, by the first network device and based on the monitored traffic, that the second network device has recovered the route to the source of the multicast group; and
   based on the determination that the second network device has recovered the route to the source of the multicast group, sending, by the first network device, a prune message for the multicast group toward the source of the multicast group to stop receiving the multicast data traffic for the multicast group from the source of the multicast group.

5. The method of claim 1,
   wherein the receiver comprises an Internet Group Management Protocol (IGMP) host device, and wherein receiving the request to join the multicast group comprises receiving, by the first network device and from the receiver, an IGMP report message identifying the multicast group,
   wherein the first network device and the second network device are connected to the receiver via a network switch on the L2 broadcast communication domain, and wherein IGMP snooping is disabled on the network switch, and wherein the L2 broadcast communication domain comprises an Ethernet local area network (LAN).

6. The method of claim 1, further comprising:
determining, by the first network device and based on the monitored traffic, that the second network device has recovered the route to the source of the multicast group; and
based on the determination that the second network device has recovered the route to the source of the multicast group, not participating, by the first network device, in a PIM (protocol independent multicast) assert mechanism to select a designated forwarder (DF) for the L2 broadcast communication domain.

7. The method of claim 1, further comprising:
determining, by the first network device and based on the monitored traffic, that the second network device has recovered the route to the source of the multicast group; and
based on the determination that the second network device has recovered the route to the source of the multicast group, stopping sending, by the first network device as the non-DR, the multicast data traffic for the multicast group, wherein the second network device remains the DR for the L2 broadcast communication domain.

8. A method comprising:
receiving, by a first network device, a request to join a multicast group from a receiver that is multi-homed to the first network device and a second network device by a layer two (L2) broadcast communication domain, wherein the second network device is a designated router (DR) for the L2 broadcast communication domain and the first network device is a non-DR for the L2 broadcast communication domain;
monitoring, by the first network device, multicast virtual private network (MVPN) control traffic that is injected into the L2 broadcast communication domain by the second network device and received by the first network device via a border gateway protocol (BGP) session, wherein the MVPN control traffic comprises a MVPN type 1 route for the second network device;
determining, by the first network device and based on the MVPN type 1 route for the second network device not being available in the first network device, that the second network device has lost a route to a source of the multicast group; and
based on the determination that the second network device has lost the route to the source of the multicast group, sending, by the first network device as the non-DR, multicast data traffic for the multicast group to the receiver on the L2 broadcast communication domain without performing a DR switchover.

9. The method of claim 1,
wherein monitoring the traffic injected into the L2 broadcast communication domain by the second network device comprises monitoring, by the first network device, multicast virtual private network (MVPN) control traffic that is injected into the L2 broadcast communication domain by the second network device and received by the first network device via a border gateway protocol (BGP) session, wherein the MVPN control traffic comprises a MVPN type 1 route for the second network device; and
wherein, based on the MVPN type 1 route for the second network device not being available in the first network device, determining that the second network device has lost the route to the source of the multicast group comprises determining, by the first network device, that the second network device is not forwarding the multicast data traffic for the multicast group to the receiver on the L2 broadcast communication domain.

10. The method of claim 8, wherein, based on the determination that the second network device has lost the route to the source of the multicast group, sending the multicast data traffic for the multicast group comprises:
sending, by the first network device as the non-DR for the L2 broadcast communication domain, a join message for the multicast group toward the source of the multicast group;
receiving, by the first network device, the multicast data traffic for the multicast group from the source of the multicast group; and
forwarding, by the first network device, the multicast data traffic for the multicast group to the receiver on the L2 broadcast communication domain, and
the method further comprising:
determining, by the first network device and based on the monitored traffic, that the second network device has recovered the route to the source of the multicast group; and
based on the determination that the second network device has recovered the route to the source of the multicast group, sending, by the first network device, a prune message for the multicast group toward the source of the multicast group to stop receiving the multicast data traffic for the multicast group from the source of the multicast group.

11. The method of claim 8, wherein the first network device and the second network device both receive the multicast data packets for the multicast group from the source of the multicast group via a multicast virtual private network (MVPN) inclusive tunnel, and wherein, based on the determination that the second network device has lost the route to the source of the multicast group, sending the multicast data traffic for the multicast group comprises:
adding, by the first network device, a receiver-facing port of the first network device that is coupled to the L2 broadcast communication domain as a downstream interface for the multicast group; and
forwarding, by the first network device, the multicast data traffic for the multicast group on the downstream interface for the multicast group to the receiver on the L2 broadcast communication domain.

12. The method of claim 11, further comprising:
determining, by the first network device and based on the monitored traffic, that the second network device has recovered the route to the source of the multicast group; and
based on the determination that the second network device has recovered the route to the source of the multicast group, removing, by the first network device, the receiver-facing port of the first network device that is coupled to the L2 broadcast communication domain as the downstream interface for the multicast group to stop sending the multicast data traffic for the multicast group to the receiver on the L2 broadcast communication domain.

13. A network device comprising:
a receiver-facing port coupled to a layer two (L2) broadcast communication domain by which a receiver is multi-homed to the network device and a designated router (DR) for the L2 broadcast communication domain, wherein the network device is a non-DR for the L2 broadcast communication domain; and a control unit comprising one or more processors configured to:
  receive a request to join a multicast group from the receiver;
  monitor traffic associated with the multicast group that is injected into the L2 broadcast communication domain by the DR and received by the network device;
  determine, based on the monitored traffic, that the DR has lost a route to a source of the multicast group; and
  based on the determination that the DR has lost the route to the source of the multicast group, send multicast data traffic for the multicast group to the receiver on the L2 broadcast communication domain without performing a DR switchover, wherein, to send the multicast data traffic for the multicast group, the control unit is configured to: send a join message for the multicast group toward the source of the multicast group; receive the multicast data traffic for the multicast group from the source of the multicast group; and forward the multicast data traffic for the multicast group to the receiver on the L2 broadcast communication domain.

14. The network device of claim 13, wherein the control unit is configured to monitor multicast data traffic for the multicast group that is injected into the L2 broadcast communication domain by the DR and received on the receiver-facing port that is coupled to the L2 broadcast communication domain.

15. The network device of claim 14, wherein the control unit is configured to, based on the first network device receiving less than a threshold level of the multicast data traffic for the multicast group on the receiver-facing port that is coupled to the L2 broadcast communication domain, determine that the DR is not forwarding the multicast data traffic for the multicast group to the receiver on the L2 broadcast communication domain.

16. The network device of claim 13,
  wherein the control unit is configured to monitor multicast virtual private network (MVPN) control traffic that is injected into the L2 broadcast communication domain by the DR and received by the network device via a border gateway protocol (BGP) session, wherein the MVPN control traffic comprises a MVPN type 1 route for the DR; and
  wherein the control unit is configured to, based on the MVPN type 1 route for the DR not being available in the network device, determine that the DR is not forwarding the multicast data traffic for the multicast group to the receiver on the L2 broadcast communication domain.

17. The network device of claim 13, wherein the control unit is configured to:
  determine, based on the monitored traffic, that the DR has recovered the route to the source of the multicast group; and
  based on the determination that the DR has recovered the route to the source of the multicast group, send a prune message for the multicast group toward the source of the multicast group to stop receiving the multicast data traffic for the multicast group from the source of the multicast group.

18. The network device of claim 13,
  wherein the receiver comprises an Internet Group Management Protocol (IGMP) host device, and wherein the control unit is configured to receive an IGMP report message identifying the multicast group,
  wherein the DR and the network device as the non-DR for the L2 broadcast communication domain are connected to the receiver via a network switch on the L2 broadcast communication domain, and wherein IGMP snooping is disabled on the network switch, and
  wherein the L2 broadcast communication domain comprises an Ethernet local area network (LAN).

19. The network device of claim 13, wherein the control unit is configured to:
  determine, based on the monitored traffic, that the DR has recovered the route to the source of the multicast group; and
  based on the determination that the DR has recovered the route to the source of the multicast group, not participate in a PIM (protocol independent multicast) assert mechanism to select a designated forwarder (DF) for the L2 broadcast communication domain.

20. The network device of claim 13, wherein the control unit is configured to:
  determine, based on the monitored traffic, that the DR has recovered the route to the source of the multicast group; and
  based on the determination that the DR has recovered the route to the source of the multicast group, stop sending the multicast data traffic for the multicast group, wherein the network device remains the non-DR and the DR remains the DR for the L2 broadcast communication domain.

21. A network device comprising:
  a receiver-facing port coupled to a layer two (L2) broadcast communication domain by which a receiver is multi-homed to the network device and a designated router (DR) for the L2 broadcast communication domain, wherein the network device is a non-DR for the L2 broadcast communication domain; and
  a control unit comprising one or more processors configured to:
    receive a request to join a multicast group from the receiver;
    monitor multicast virtual private network (MVPN) control traffic that is injected into the L2 broadcast communication domain by the DR and received by the network device via a border gateway protocol (BGP) session, wherein the MVPN control traffic comprises a MVPN type 1 route for the DR;
    determine, based on the MVPN type 1 route for the DR not being available in the network device, that the DR has lost a route to a source of the multicast group; and
    based on the determination that the DR has lost the route to the source of the multicast group, send multicast data traffic for the multicast group to the receiver on the L2 broadcast communication domain without performing a DR switchover.

22. The network device of claim 21, wherein the control unit is configured to, based on the determination that the DR has lost the route to the source of the multicast group:
  send a join message for the multicast group toward the source of the multicast group;
  receive the multicast data traffic for the multicast group from the source of the multicast group; and
  forward the multicast data traffic for the multicast group to the receiver on the L2 broadcast communication domain, and wherein the control unit is configured to:
   determine, based on the monitored traffic, that the DR has recovered the route to the source of the multicast group; and
   based on the determination that the DR has recovered the route to the source of the multicast group, send a prune message for the multicast group toward the source of the multicast group to stop receiving the multicast data traffic for the multicast group from the source of the multicast group.

23. The network device of claim 21, wherein the DR and the network device as the non-DR both receive the multicast data packets for the multicast group from the source of the multicast group via a multicast virtual private network (MVPN) inclusive tunnel, and wherein the control unit is configured to, based on the determination that the DR has lost the route to the source of the multicast group:
   add the receiver-facing port of the network device that is coupled to the L2 broadcast communication domain as a downstream interface for the multicast group; and
   forward the multicast data traffic for the multicast group on the downstream interface for the multicast group to the receiver on the L2 broadcast communication domain.

24. The network device of claim 23, wherein the control unit is configured to:
   determine, based on the monitored traffic, that the DR has recovered the route to the source of the multicast group; and
   based on the determination that the DR has recovered the route to the source of the multicast group, remove the receiver-facing port of the first network device that is coupled to the L2 broadcast communication domain as the downstream interface for the multicast group to stop sending the multicast data traffic for the multicast group to the receiver.

25. A non-transitory computer readable medium storing instructions that when executed cause one or more processors to:
   receive, by a first network device, a request to join a multicast group from a receiver that is multi-homed to the first network device and a second network device by a layer two (L2) broadcast communication domain, wherein the second network device is a designated router (DR) for the L2 broadcast communication domain and the first network device is a non-DR for the L2 broadcast communication domain;
   monitor, by the first network device, traffic associated with the multicast group that is injected into the L2 broadcast communication domain by the second network device and received by the first network device;
   determine, by the first network device and based on the monitored traffic, that the second network device has lost a route to a source of the multicast group; and
   based on the determination that the second network device has lost the route to the source of the multicast group, send, by the first network device as the non-DR, multicast data traffic for the multicast group to the receiver on the L2 broadcast communication domain without performing a DR switchover, wherein the instructions further cause the one or more processors to: send, by the first network device, a join message for the multicast group toward the source of the multicast group; receive, by the first network device, the multicast data traffic for the multicast group from the source of the multicast group; and forward, by the first network device, the multicast data traffic for the multicast group to the receiver on the L2 broadcast communication domain.

* * * * *